US 8,991,168 B2

(12) United States Patent
Satake et al.

(10) Patent No.: US 8,991,168 B2
(45) Date of Patent: Mar. 31, 2015

(54) LIQUID PRESSURE MOTOR

(75) Inventors: Teruhiko Satake, Gifu (JP); Takuhiro Karino, Gifu (JP)

(73) Assignee: Nabtesco Corporation, Tokyo (JP)

( * ) Notice: Subject to any disclaimer, the term of this patent is extended or adjusted under 35 U.S.C. 154(b) by 901 days.

(21) Appl. No.: 13/145,740

(22) PCT Filed: Jun. 24, 2009

(86) PCT No.: PCT/JP2009/061446
§ 371 (c)(1),
(2), (4) Date: Jul. 21, 2011

(87) PCT Pub. No.: WO2010/092701
PCT Pub. Date: Aug. 19, 2010

(65) Prior Publication Data
US 2011/0283692 A1    Nov. 24, 2011

(30) Foreign Application Priority Data

Feb. 10, 2009 (JP) ................. 2009-028044

(51) Int. Cl.
*F15B 11/04* (2006.01)
*F15B 11/08* (2006.01)
*F16H 61/4043* (2010.01)
*F16H 61/4157* (2010.01)
*F16H 63/30* (2006.01)

(52) U.S. Cl.
CPC ....... *F15B 11/08* (2013.01); *F15B 2211/50518* (2013.01); *F15B 2211/5154* (2013.01); *F15B 2211/528* (2013.01); *F15B 2211/6355* (2013.01); *F15B 2211/67* (2013.01); *F15B 2211/7058* (2013.01); *F15B 2211/755* (2013.01); *F15B 2211/853* (2013.01); *F15B 2211/8616* (2013.01); *F16H 2063/3033* (2013.01); *F16H 61/4043* (2013.01); *F16H 61/4157* (2013.01)

USPC .............................................. 60/460; 60/466

(58) Field of Classification Search
USPC .......................................... 60/460, 466, 493
See application file for complete search history.

(56) References Cited

U.S. PATENT DOCUMENTS 5,992,148 A * 11/1999 Satake ............................ 60/493

FOREIGN PATENT DOCUMENTS

JP    60-038901 U    3/1985
JP    2-212605 A    8/1990

OTHER PUBLICATIONS

Notification Concerning Transmittal, International Preliminary Report for Application No. PCT/JP2009/061446 mailed Aug. 25, 2011, with English translation thereof (5 pages).

(Continued)

*Primary Examiner* — F. Daniel Lopez
(74) *Attorney, Agent, or Firm* — Osha Liang LLP

(57) ABSTRACT

A hydraulic motor 100 includes a switching valve 3 which is connected to a pilot passage 54 by which a pressure fluid is introduced into a back pressure chamber 21 of a relief valve 2 and takes a first changeover position 3a where the back pressure chamber 21 is connected to a tank 102 or a second changeover position 3b where the pilot passage 54 is connected to the back pressure chamber 21. By this switching valve 3, the pressure fluid supplied to a hydraulic motor mechanism 1 is introduced into the back pressure chamber 21 via the pilot passage 54 when the hydraulic motor mechanism 1 is in operation, whereas the back pressure chamber 21 is connected to the tank 102 as the pressure in the pilot passage 54 becomes not higher than a predetermined pressure when the hydraulic motor mechanism 1 is being braked.

15 Claims, 2 Drawing Sheets

(56) References Cited

OTHER PUBLICATIONS

Translation of Notification of Transmittal, International Preliminary Report and Written Opinion (6 pages).
Abstract of JP 2-212605 A, Publication date Aug. 23, 1990, 1 page.
Bibliographic data sheet for JP 60-038901 U, Publication date Mar. 18, 1985, 1 page.
International Search Report issued in PCT/JP2009/061446, mailed Aug. 25, 2009, with translation, 4 pages.
Office Action for Korean Application No. 10-2011-7018482 dated Jan. 21, 2013, with English translation thereof (10 pages).
Office Action issued in corresponding Chinese Application No. 200980156417.4, mailed Nov. 29, 2013 (10 pages).
Office Action Issued in Chinese Application No. 200980156417.4, Dated Jul. 10, 2013 (8 Pages With English Translation).

* cited by examiner

LIQUID PRESSURE MOTOR

TECHNICAL FIELD

The present invention relates to a liquid pressure motor which performs continuous rotary motion by using the pressure energy of liquid.

BACKGROUND ART

An example of technologies related to such liquid pressure motors is recited in Patent Document 1. Patent Document 1 recites a technology in regard to a braking device of a hydraulic motor. This hydraulic braking device is arranged as follows: When the hydraulic motor is driving, a pressure is introduced from a pump to a spring chamber of an on-off valve so that the on-off valve does not operate. When the hydraulic motor is stopped, a control valve returns to a neutral position so that pressure is no longer supplied to the spring chamber (back pressure chamber) of the on-off valve and hence the on-off valve becomes operable, and a braking force is generated for the hydraulic motor as the on-off valve is operated by the hydrostatic pressure from the hydraulic motor.

PRIOR ART DOCUMENTS

Patent Documents

[PATENT DOCUMENT 1] Japanese Utility Model Publication No. 38901/1985 (Jitsukaisho 60-38901)

DISCLOSURE OF THE INVENTION

Problem to be Solved

The hydraulic braking device recited in Patent Document 1, however, is structured so that, when the control valve returns to the neutral position, a control passage is connected to inlet/outlet passages via throttles. In the meanwhile, even after the control valve returns to the neutral position, the pressures in the inlet/outlet passages 5 and 6 are still high in many cases. For this reason, the pressure in the back pressure chamber of the on-off valve which chamber is connected to the control passage remains to be high. As a result, when the hydraulic motor is stopped, the on-off valve operates with a pressure higher than a setting pressure. When the on-off valve operates with a pressure higher than the setting pressure, the fluid discharged from the hydraulic motor and then returning to the hydraulic motor may significantly vary in terms of pressure (i.e., pressure oscillation may occur). This induces a problem such that, for example, in a construction vehicle using the hydraulic braking device as a braking device of a driving hydraulic motor, the braking force is varied and the braking noise is loud. Furthermore, since the on-off valve operates with a pressure higher than the setting pressure, the vibrations generated when the mechanism is stopped are serious.

The present invention was done to solve the problem above, and an object of the invention is to provide a liquid pressure motor having a brake arrangement capable of restraining a pressure change of liquid discharged from a liquid pressure motor mechanism (i.e. to restrain pressure fluctuation) when the liquid pressure motor mechanism is stopped and capable of reducing the vibrations generated when the mechanism is stopped.

Means for Solving Problem and Effects

A liquid pressure motor of the present invention has the following features for achieving the object above. In other words, the liquid pressure motor of the present invention includes the following features singly or in combination.

According to the first aspect of the invention, to achieve the object above, the liquid pressure motor includes: a first inlet/outlet port and a second inlet/outlet port both connected to a direction switching valve; a first inlet/outlet passage which connects the first inlet/outlet port with a liquid pressure motor mechanism; a second inlet/outlet passage which connects the second inlet/outlet port with the liquid pressure motor mechanism; a counter balance valve which is connected to the first inlet/outlet passage and the second inlet/outlet passage; a bypass passage which connects the first inlet/outlet passage between the counter balance valve and the liquid pressure motor mechanism with the second inlet/outlet passage between the counter balance valve and the liquid pressure motor mechanism; a connection valve which is provided in the bypass passage and is opened when a fluid pressure in the first inlet/outlet passage or the second inlet/outlet passage becomes not lower than a working pressure; and a pilot passage which is connected to the counter balance valve and introduces a fluid pressure to a back pressure chamber of a connection valve by which chamber a working pressure of the connection valve is controlled, a switching valve connected to the pilot passage being provided to have a first changeover position where the back pressure chamber is connected to the tank and a second changeover position where the pilot passage is connected to the back pressure chamber, and by the switching valve the liquid pressure supplied to the liquid pressure motor mechanism being introduced into the back pressure chamber via the pilot passage when the liquid pressure motor mechanism is in operation, whereas, when the liquid pressure motor mechanism is being braked, the back pressure chamber being connected to the tank when the fluid pressure in the pilot passage becomes equal to or lower than a predetermined pressure.

According to this arrangement, when the liquid pressure motor mechanism is being braked, the back pressure chamber of the connection valve is connected to the tank and hence the pressure in the back pressure chamber is decreased to be equal to the pressure in the tank. The connection valve operates with a predetermined setting pressure as a result, so that the valve opening pressure of the connection valve is maintained to be constant and pressure changes (pressure fluctuation) of the liquid discharged from the liquid pressure motor mechanism are restrained. Furthermore, the vibrations generated when the liquid pressure motor mechanism is stopped are restrained.

According to the second aspect of the present invention, the liquid pressure motor is arranged so that a neutral spring is provided at one or more end portion of the counter balance valve, a liquid pressure is introduced from the first inlet/outlet passage to one chamber of the counter balance valve, and a liquid pressure is introduced from the second inlet/outlet passage to the other chamber of the counter balance valve, a return spring is provided at one end portion of the switching valve, whereas a pilot pressure is introduced from the pilot passage to the other end portion of the switching valve, and a spring force of the return spring by which the switching valve returns to the first changeover position is arranged to be larger than a spring force of the neutral spring by which the counter balance valve returns to a neutral position.

According to this arrangement, when the counter balance valve returns to the neutral position, the liquid pressure on the supply side is lower than the spring force of the neutral spring by which the counter balance valve returns to the neutral position. Since the spring force of the return spring by which the switching valve returns to the first changeover position is arranged to be larger than the spring force of the neutral spring by which the counter balance valve returns to the neutral position, the switching valve is certainly switched to the first changeover position where the back pressure chamber is connected to the tank, when the counter balance valve returns to the neutral position.

According to the third aspect of the present invention, the liquid pressure motor is arranged so that the neutral position of the counterbalance valve is a changeover position where the pilot passage is cut off from the first inlet/outlet port and the second inlet/outlet port.

According to this arrangement, the pilot passage is cut off from the first inlet/outlet port and the second inlet/outlet port when the counter balance valve returns to the neutral position. Because of this, even if the pump pressure or the like is varied, the back pressure chamber of the connection valve is not influenced by the same. The operation of the connection valve is therefore further stabilized.

According to the fourth aspect of the present invention, the liquid pressure motor is arranged so that a throttle is formed on a passage in the switching valve which connects the pilot passage with the back pressure chamber.

According to this arrangement, it is possible to avoid rapid increase in the liquid pressure in the back pressure chamber when the liquid pressure motor mechanism is in operation, and hence rapid increase in the rotation number of the liquid pressure motor mechanism is mitigated.

According to the fifth aspect of the present invention, the liquid pressure motor is arranged so that the connection valve is formed to be capable of being biased in a closing direction via a partition provided at the back pressure chamber of the connection valve.

In the liquid pressure motor of the present invention, the back pressure chamber of the connection valve is connected to the tank when the braking is conducted. However, according to the arrangement above, the connection valve is biased in the closing direction via the partition even when the braking is conducted. This makes it possible to set different working pressures for the connection valve and to switch the braking force between the low-speed mode and the high-speed mode.

According to the sixth aspect of the present invention, the liquid pressure motor further includes: a biasing spring which is provided in the back pressure chamber of the connection valve and biases the connection valve in the closing direction; a piston which is the partition capable of biasing the biasing spring in a contracting direction; and a pressure chamber which is divided from the back pressure chamber by the piston, a two speed switching control pressure being introduced into the pressure chamber.

According to this arrangement, the biasing spring is contracted by the two speed switching control pressure via the piston even when the braking is conducted, and hence the braking force is switchable between the low-speed mode and the high-speed mode. Furthermore, because the two speed switching control pressure is used, it is unnecessary to additionally provide a pilot pump or the like solely for generating a control pressure for the connection valve, and hence the control mechanism of the liquid pressure motor is simplified.

According to the seventh aspect of the present invention, the liquid pressure motor is arranged so that the two speed switching control pressure is a two-speed switching signal pressure which is introduced into a pilot chamber of a two-speed switching valve.

According to this arrangement, because the two-speed switching signal pressure is used as a two speed switching control pressure, it is possible to change the braking force in accordance with the driving speed (low-speed mode and high-speed mode) without changing the structure of the hydraulic system (e.g. the structure of the hydraulic system of a construction vehicle).

According to the eighth aspect of the present invention, the liquid pressure motor is arranged so that the two speed switching control pressure is a two speed switching instruction pressure which is introduced from a two-speed switching valve into a tilt cylinder.

According to this arrangement, since the two speed switching instruction pressure is used as a two speed switching control pressure, a pressure higher than the two-speed switching signal pressure is supplied to the back pressure chamber, and hence the pressure receiving area of the piston which is the partition is downsized (i.e. the diameter of the piston is reduced). Furthermore, since the two speed switching instruction pressure (driving pressure) is higher than the two-speed switching signal pressure, it is possible to increase the working pressure by increasing the biasing spring force.

DESCRIPTION OF EMBODIMENTS

The following will describe the best mode of the present invention with reference to figures. It is noted that the liquid pressure motor of the present invention is used as, for example, a driving motor of a construction vehicle such as a hydraulic excavator. While a typical medium for operating the liquid pressure motor is oil, various types of liquids may be used in place of oil. The following descriptions take as an example of the liquid pressure motor a hydraulic motor using oil as a working medium.

(Structure of Hydraulic Motor)

Figure 1:
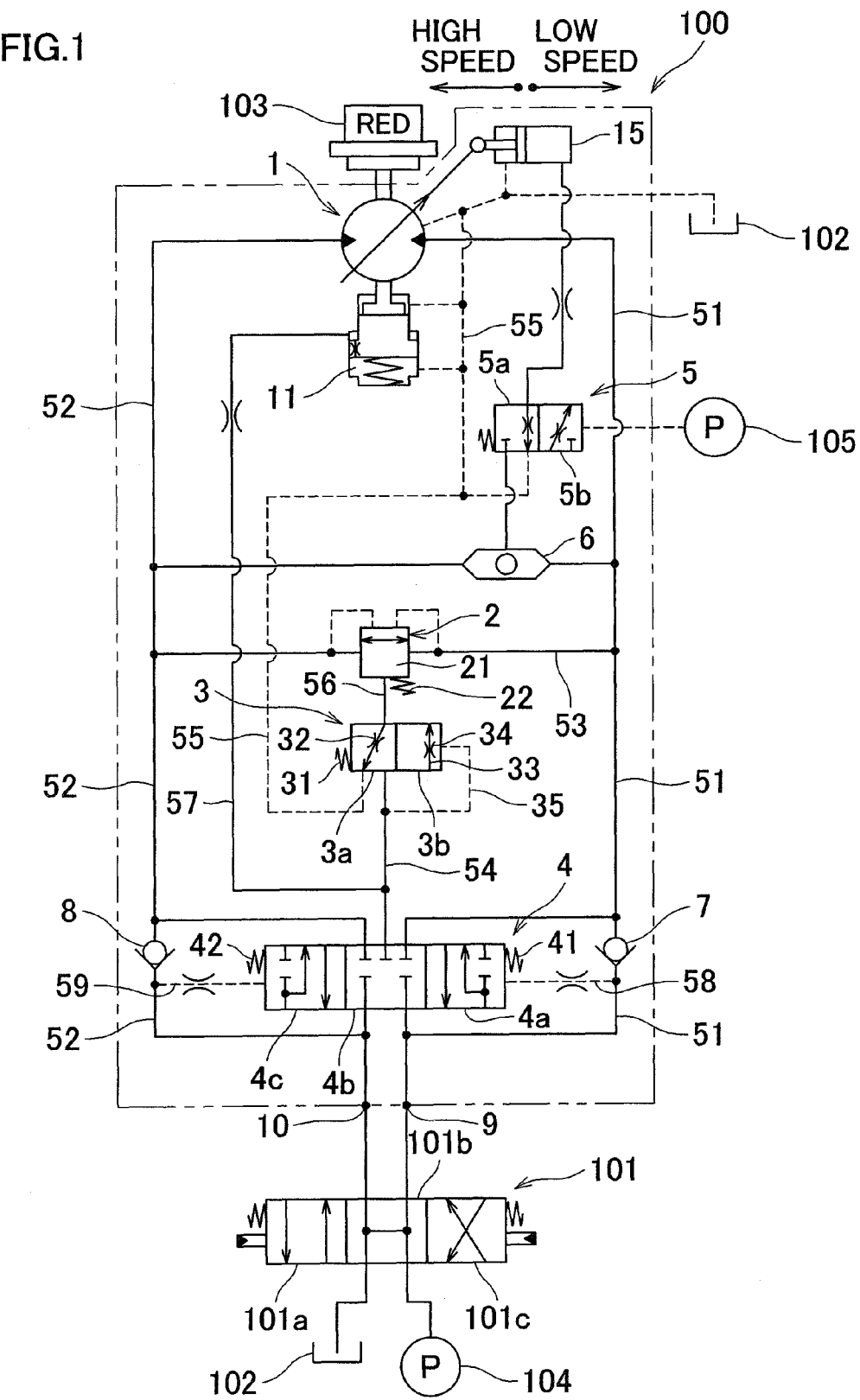
FIG. 1 is a hydraulic circuit diagram showing a hydraulic motor according to an embodiment of the present invention.

FIG. 1 is a hydraulic circuit diagram showing a hydraulic motor 100 according to an embodiment of the present invention. As shown in FIG. 1, the hydraulic motor 100 is connected to a direction switching valve 101 which controls the supply and discharge of pressure fluid, at a first inlet/outlet port 9 and a second inlet/outlet port 10. The direction switching valve 101 is connected to a pump 104 which supplies the pressure fluid to the hydraulic motor 100, and the oil supplied to the hydraulic motor 100 returns to a tank 102. Furthermore, the hydraulic motor 100 is connected to a pilot pump 105 which supplies pilot pressure fluid by which the driving condition is switched between a low-speed mode and a high-speed mode and also connected to a speed reducer 103.

The hydraulic motor 100 is provided with a hydraulic motor mechanism 1 connected to the speed reducer 103, and this hydraulic motor mechanism 1 is connected to the first inlet/outlet port 9 via a first inlet/outlet passage 51. Furthermore, the hydraulic motor mechanism 1 is connected to the second inlet/outlet port 10 via a second inlet/outlet passage 52. The first inlet/outlet passage 51 and the second inlet/outlet passage 52 are connected to a counter balance valve 4 via a throttle passage 58 and a throttle passage 59, respectively. The pressure fluid from the first inlet/outlet passage 51 is introduced into one pilot chamber of the counter balance valve 4 via the throttle passage 58, whereas the pressure fluid from the second inlet/outlet passage 52 is introduced into the other pilot chamber of the counterbalance valve 4 via the throttle passage 59. In addition to the above, the first inlet/outlet passage 51 and the second inlet/outlet passage 52 are provided with a check valve 7 and a check valve 8, respectively.

The counterbalance valve 4 is a three position valve, and takes a first changeover position 4a where the second inlet/outlet passage 52 is connected to the tank 102, a second changeover position 4c where the first inlet/outlet passage 51 is connected to the tank 102, or a neutral position 4b where the first inlet/outlet passage 51 and the second inlet/outlet passage 52 are cut off from the tank 102.

The first inlet/outlet passage 51 between the counter balance valve 4 and the hydraulic motor 100 is connected with the second inlet/outlet passage 52 between the counter balance valve 4 and the hydraulic motor 100, by a bypass passage 53. This bypass passage 53 is provided with a relief valve 2 (connection valve). The relief valve 2 is opened when the fluid pressure in the first inlet/outlet passage 51 or the second inlet/outlet passage 52 becomes equal to or higher than the working pressure of the relief valve 2, so as to connect the first inlet/outlet passage 51 with the second inlet/outlet passage 52 and cause the oil to flow from the passage having a higher fluid pressure to the passage having a lower pressure. Furthermore, the relief valve 2 has a back pressure chamber 21 for controlling the working pressure. As the pressure fluid is introduced into this back pressure chamber 21, the working pressure is controlled. It is noted that the setting pressure of the relief valve 2 is a working pressure which is determined by the spring force of a biasing spring 22 which is provided in the back pressure chamber 21 of the relief valve 2. The biasing spring 22 is a spring which biases the relief valve 2 in the closing direction.

Between the relief valve 2 and the counter balance valve 4 is provided a switching valve 3. This switching valve 3 is connected to the counter balance valve 4 via a pilot passage 54. The switching valve 3 is connected to the relief valve 2 (the back pressure chamber 21 of the relief valve 2) via a passage 56. The switching valve 3 is a two position valve and takes a first changeover position 3a where the back pressure chamber 21 of the relief valve 2 is connected to the tank 102 via a passage 56 and a drain passage 55 or a second changeover position 3b where the pilot passage 54 is connected to the back pressure chamber 21 via the passage 56. The passage in the switching valve 3 of the second changeover position 3b is a throttle passage 33 having a throttle 34, and the passage in the switching valve 3 of the first changeover position 3a is a throttle passage 32. The counter balance valve 4 connects the pilot passage 54 with the first inlet/outlet passage 51 when it is at the first changeover position 4a, and connects the pilot passage 54 with the second inlet/outlet passage 52 when it is at the second changeover position 4c.

The hydraulic motor 100 is provided with a speed changing mechanism by which the driving mode of the motor is switched between a low-speed mode and a high-speed mode. This speed changing mechanism is constituted by a piston 15 (tilt cylinder 15), a high-low speed switching valve 5, and a shuttle valve 6. The high-low speed switching valve 5 (two-speed switching valve) is a two position valve and takes a first changeover position 5a where the pressure fluid is discharged from the pressure chamber of the tilt cylinder 15 or a second changeover position 5b where the pressure fluid is supplied to the pressure chamber of the tilt cylinder 15.

(Operation of Hydraulic Motor)

Now, the operation of the hydraulic motor 100 will be detailed. The direction switching valve 101 connected to the hydraulic motor 100 is a three position valve, and takes a first changeover position 101a when the hydraulic motor mechanism runs forward (or backward), takes a second changeover position 101c when the hydraulic motor mechanism 1 runs backward (or forward), or takes a neutral position 101b when the hydraulic motor mechanism 1 is stopped.

It is noted that the following will describe a case where the direction switching valve 101 is switched from the neutral position 101b to the first changeover position 101a to run the hydraulic motor mechanism 1 (i.e. drives the motor mechanism 1) and a case where the direction switching valve 101 returns to the neutral position 101b after the case above to stop the hydraulic motor mechanism 1 (i.e. brakes the motor mechanism 1). A case where the direction switching valve 101 is switched to the second changeover position 101c to run the hydraulic motor mechanism 1 and then the mechanism 1 is stopped is not described, in order to avoid the repetition.

(Drive of Hydraulic Motor Mechanism 1)

As the direction switching valve 101 is switched from the neutral position 101b to the first changeover position 101a, the pressure fluid from the pump 104 is supplied to the hydraulic motor mechanism 1 via the first inlet/outlet passage 51. In the meanwhile, the pressure fluid from the pump 104 is also supplied to one pilot chamber of the counter balance valve 4 via the throttle passage 58, so that the counter balance valve is switched from the neutral position 4b to the first changeover position 4a. As the counter balance valve 4 is switched to the first changeover position 4a, the pressure fluid from the pump 104 is introduced as a pilot pressure to the switching valve 3 via the pilot passage 54 and the passage 35. This causes the switching valve 3 to switch from the first changeover position 3a to the second changeover position 3b, and the pressure fluid is also supplied from the pilot passage 54 via the throttle passage 33 to the back pressure chamber 21 of the relief valve 2. The working pressure of the relief valve 2 increases as the pressure fluid is supplied to the back pressure chamber 21, with the result that the relief valve 2 becomes no longer in operation and no oil flows between the first inlet/outlet passage 51 and the second inlet/outlet passage 52 through the bypass passage 53.

At this stage, the pressure fluid is supplied also to the pressure chamber of the hydraulic motor mechanism 1 via the passage 57, so that a brake 11 (parking brake) of the hydraulic motor mechanism 1 is released. In the meanwhile, when the counter balance valve 4 is switched to the first changeover position 4a, the pressure fluid ejected from the hydraulic motor mechanism 1 is discharged to the tank 102 via the second inlet/outlet passage 52, the counter balance valve 4, and the direction switching valve 101. As a result of a series of these operations, the hydraulic motor mechanism 1 drives at a predetermined rotation number.

Note that, since the throttle 34 is formed in the passage in the switching valve 3 at the second changeover position 3b, rapid increase in the pressure in the back pressure chamber 21 of the relief valve 2 is restrained. The relief valve 2 therefore operates immediately after the counter balance valve 4 is switched to the first changeover position 4a, and hence a part of the pressure fluid supplied from the pump 104 to the first inlet/outlet passage 51 is discharged to the tank 102 via the bypass passage 53. For this reason, rapid increase in the rotation number of the hydraulic motor mechanism 1 is restrained.

Now, the speed changing mechanism of the hydraulic motor 100 will be detailed. When the high-low speed switching valve 5 is at the first changeover position 5a, the pressure fluid has been discharged from the pressure chamber of the tilt cylinder 15, and hence the rod of the tilt cylinder 15 is at the Low position and the motor is in the low-speed mode (high torque and low speed rotation) with which the capacity of the hydraulic motor mechanism 1 is large. When the pressure fluid from the pilot pump 105 switches the high-low speed switching valve 5 from the first changeover position 5a to the second changeover position 5b, the pressure fluid for the pump 104 is supplied to the pressure chamber of the tilt cylinder 15 via the shuttle valve 6, with the result that the rod of the tilt cylinder 15 is switched to the Hi position and the motor is in the high-speed mode (low torque and high speed rotation) with which the capacity of the hydraulic motor mechanism 1 is small.

(Stop of Hydraulic Motor Mechanism 1)

Now, the operation when the hydraulic motor mechanism 1 is stopped will be described. As the direction switching valve 101 returns from the first changeover position 101a to the neutral position 101b, the pump 104 is connected to the tank 102 and hence the pressure of the oil discharged from the pump 104 is lowered. This decreases the pressure in the throttle passage 58, and hence the counter balance valve 4 returns from the first changeover position 4a to the neutral position 4b on account of the spring forces of the neutral springs 41 and 42 provided at the respective end portions of the counter balance valve 4. As the counter balance valve 4 returns to the neutral position 4b, the pump 104 is cut off from the pilot passage 54. At this stage, the pressure of the pilot passage 54 is not higher than a predetermined pressure. The switching valve 3 returns from the second changeover position 3b to the first changeover position 3a on account of the spring force of a return spring 31 which is provided at one end portion of the switching valve 3. As a result, the back pressure chamber 21 of the relief valve 2 is connected to the tank 102 via the passage 56 and the drain passage 55. This causes the pressure fluid in the back pressure chamber 21 to be drained to the tank 102, and hence the pressure in the back pressure chamber 21 is decreased to be equal to the pressure in the tank 102. As such, the relief valve 2 starts to operate with its setting pressure. It is noted that the throttle of the throttle passage 32 at the first changeover position 3a of the switching valve 3 is provided to adjust the speed of discharging the pressure fluid from the back pressure chamber 21 to the tank 102. Furthermore, because the pressure in the passage 57 is decreased as the pressure in the pilot passage 54 is decreased, the pressure fluid in the pressure chamber of the hydraulic motor mechanism 1 is also drained to the tank 102, with the result that the brake 11 (parking brake) of the hydraulic motor mechanism 1 operates.

On the other hand, as the counter balance valve 4 returns to the neutral position 4b, the second inlet/outlet passage 52 is cut off from the second inlet/outlet port 10. The pressure fluid discharged from the hydraulic motor mechanism 1 cannot therefore return to the tank 102 and is guided to the bypass passage 53 via the second inlet/outlet passage 52. As the relief valve 2 operates, the pressure fluid flows into the first inlet/outlet passage 51 and then returns to the hydraulic motor mechanism 1. Because the resistance of the relief valve 2 functions as a braking force (braking force), the hydraulic motor mechanism 1 stops after a predetermined time elapses. It is noted that the brake 11 (parking brake) of the hydraulic motor mechanism 1 also provides a braking force. As described above, because the back pressure chamber 21 of the relief valve 2 is connected to the tank 102, the pressure in the back pressure chamber 21 is decreased to be equal to the pressure in the drain passage 55. Since the relief valve 2 operates at a predetermined setting pressure as a result, its valve opening pressure is maintained to be constant and hence a pressure change (pressure fluctuation) of the pressure fluid discharged from the hydraulic motor mechanism 1 is restrained. Furthermore, since the relief valve 2 operates with the predetermined setting pressure, the vibrations generated when the hydraulic motor mechanism 1 is stopped are restrained as compared to the conventional cases.

The spring force of the return spring 31 by which the switching valve 3 returns from the second changeover position 3b to the first changeover position 3a is arranged to be larger than the spring forces of the neutral springs 41 and 42 by which the counter balance valve 4 returns to the neutral position 4b. On the other hand, when the counter balance valve 4 returns to the neutral position 4b, the pressure in the first inlet/outlet passage 51 is smaller than the spring forces of the neutral springs 41 and 42 by which the counter balance valve 4 returns to the neutral position 4b. As described above, the spring force of the return spring 31 by which the switching valve 3 returns to the first changeover position 3a is arranged to be larger than the spring forces of the neutral springs 41 and 42 by which the counter balance valve 4 returns to the neutral position 4b. For this reason, when the counter balance valve 4 returns to the neutral position 4b, the switching valve 3 is certainly switched to the first changeover position 3a where the back pressure chamber 21 is connected to the tank 102.

In addition to the above, because the neutral position 4b of the counter balance valve 4 is a changeover position where the pilot passage 54 is cut off from the first inlet/outlet port 9 and the second inlet/outlet port 10, the pilot passage 54 is cutoff from the first inlet/outlet port 9 and the second inlet/outlet port 10 when the counterbalance valve 4 returns to the neutral position 4b. As a result, even if the pressure of the pump 104 pulsates, the back pressure chamber 21 of the relief valve 2 is not influenced by such pressure changes. The working pressure of the relief valve 2 is therefore maintained to be constant and hence the relief valve 2 operates stably.

(Another Embodiment)

Figure 2:
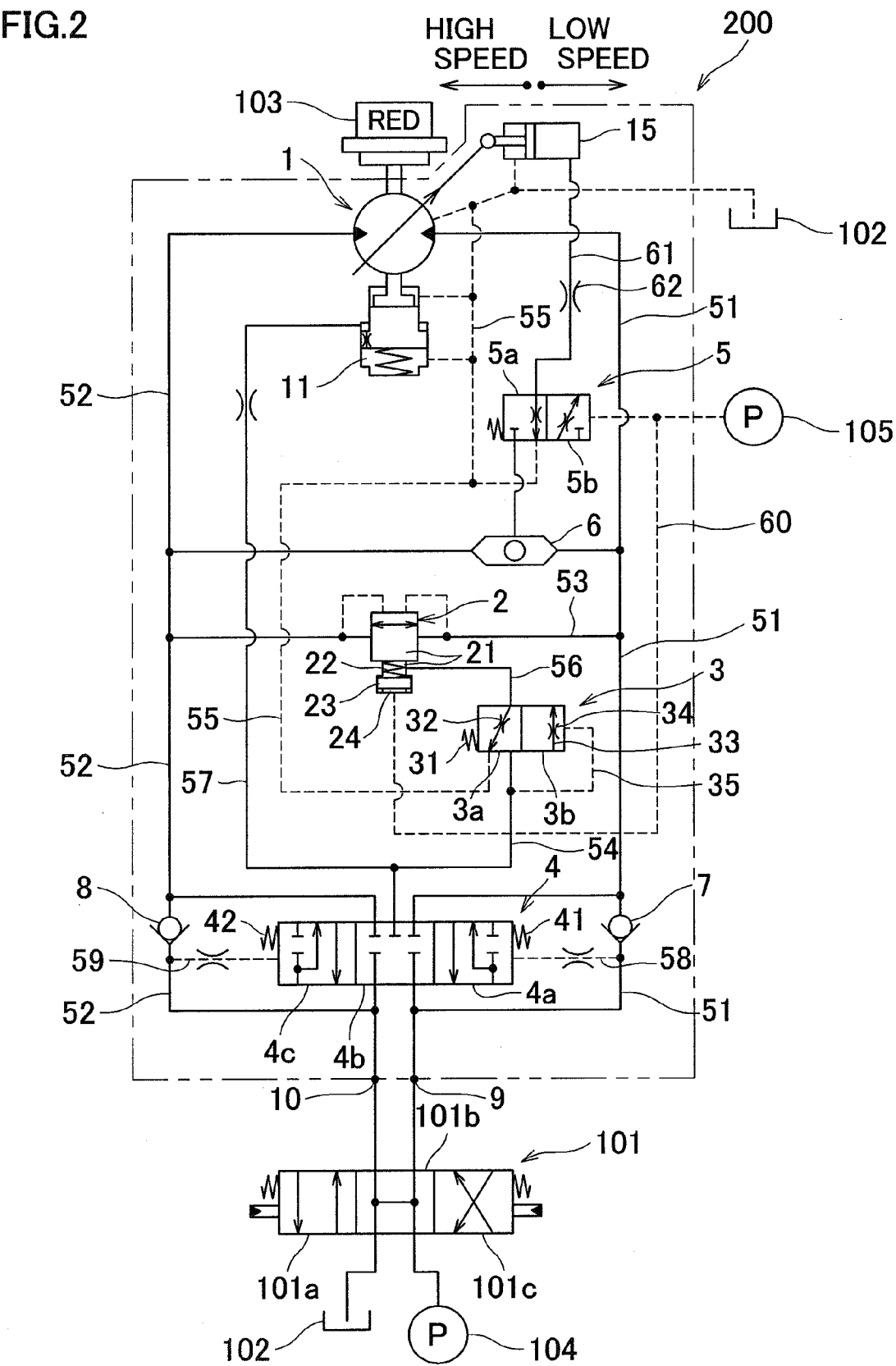
FIG. 2 is a hydraulic circuit diagram showing a hydraulic motor according to another embodiment of the present invention.

FIG. 2 is a hydraulic circuit diagram showing a hydraulic motor 200 according to another embodiment of the present invention. In this hydraulic circuit diagram, the components identical with those in the hydraulic circuit diagram of the above-described hydraulic motor 100 are denoted by the same reference numerals.

As described above, the hydraulic motor 100 is a hydraulic motor whose driving mode is switchable between a low-speed mode and a high-speed mode. When the hydraulic motor mechanism 1 in operation is stopped, in the low-speed mode a large amount of the pressure fluid is discharged from the hydraulic motor mechanism 1 in a short time as compared to the high-speed mode, and hence the braking pressure of the relief valve 2 rapidly increases. As such, the hydraulic motor 100 has a problem in that the degree of vibrations when the motor is stopped and the braking distance differ between the low-speed mode and the high-speed mode. When the spring force of the biasing spring 22 provided in the back pressure chamber 21 of the relief valve 2 is determined in consideration of the vibrations generated when the motor in the low-speed mode is stopped, the braking distance in the high-speed mode is unnecessarily long. On the other hand, when the spring force of the biasing spring 22 is determined in consideration of the high-speed mode, the vibrations are serious in the low-speed mode.

The hydraulic motor 200 of the present embodiment resolves the problem above. The hydraulic motor 200 is arranged so that the spring force of the biasing spring 22 of the relief valve 2 is increased by using a two-speed switching signal pressure which is introduced into the pilot chamber of the high-low speed switching valve 5 (two-speed switching valve).

As shown in FIG. 2, in the back pressure chamber 21 of the relief valve 2, a piston 23 (partition) is provided to contact one end face of the biasing spring 22. Furthermore, the piston 23 forms a pressure chamber 24 divided from the back pressure chamber 21. It is noted that the spring force of the biasing spring 22 is determined so that the vibrations and acceleration when the motor in the low-speed mode is stopped fall within suitable ranges.

The pilot pump 105 is connected to the pressure chamber 24 of the relief valve 2 via a passage 60. The two-speed switching signal pressure is introduced into the pressure chamber 24 via this passage 60.

Now, the operation of the relief valve 2 when the hydraulic motor mechanism 1 is stopped will be described. The operation in the low-speed mode and the operation in the high-speed mode will be detailed separately.

First, when the motor mechanism operating in the low-speed mode is stopped, the back pressure chamber 21 of the relief valve 2 is connected to the tank 102. Since no two-speed switching signal pressure is introduced into the pressure chamber 24, the relief valve 2 operates with a predetermined setting pressure (i.e. the spring force of the biasing spring 22) which is determined to be suitable for the low-speed mode. As such, the hydraulic motor mechanism 1 is stopped with suitable vibrations and acceleration.

On the other hand, when the hydraulic motor mechanism 1 operating in the high-speed mode is stopped, the back pressure chamber 21 of the relief valve 2 is connected to the tank 102 in the same manner as in the low-speed mode. At this stage, since the pressure fluid (two-speed switching signal pressure) has been introduced from the pilot pump 105 to the pressure chamber 24 via the passage 60, the piston 23 biases the biasing spring 22 in the contracting direction, with the result that the setting pressure of the relief valve 2 is increased. In the meanwhile, the amount of the pressure fluid flowing from the hydraulic motor mechanism 1 to the bypass passage 53 is small as compared to the amount in the low-speed mode. It is therefore possible to stop the hydraulic motor mechanism 1 with suitable vibrations and acceleration similar to those in the low-speed mode. It is noted that the pressure fluid (two-speed switching signal pressure) from the pilot pump 105 is lower in terms of pressure than the pressure fluid supplied from the pump 104 to the back pressure chamber 21 of the relief valve 2, and is determined in consideration of the braking force in the high-speed mode.

As described above, the hydraulic motor 200 of the present embodiment makes it possible to bias the relief valve 2 in the closing direction via the piston 23 by the two-speed switching signal pressure from the pilot pump 105, when the motor operates in the high-speed mode. This allows the relief valve 2 to be set at different relief pressures, and hence the braking force is changeable between the low-speed mode and the high-speed mode. In other words, when the hydraulic motor 200 is used as a driving motor of a hydraulic excavator, the vibrations that the operator feels when the motor is stopped are almost unchanged between the low-speed mode and the high-speed mode. As such, the vibrations when the motor is stopped are mitigated.

It is noted that the two-speed switching signal pressure above may not be used. For example, a two speed switching instruction pressure introduced from the high-low speed switching valve 5 (two-speed switching valve) to the tilt cylinder 15 may be supplied to the pressure chamber 24 of the relief valve 2. The high-low speed switching valve 5 is connected to the tilt cylinder 15 by a passage 61. The two speed switching instruction pressure is generated by the pressure fluid flowing in this passage 61. For introducing the two speed switching instruction pressure into the pressure chamber 24, a passage may be branched from the upstream or downstream of a throttle 62 of the passage 61.

It is also noted that, in the present invention, a term "two-speed switching control pressure" is used as a superordinate concept of the two-speed switching signal pressure and the two speed switching instruction pressure. Because the two-speed switching control pressure is used, it is unnecessary to additionally provide a pilot pump or the like solely for generating a pressure for controlling the relief valve 2.

The preferred embodiments of the present invention have been described above. The present invention, however, is not limited to them and may be variously changed within the scope of claims. For example, the following modification is possible.

(1) While in the embodiment above the neutral springs 41 and 42 are provided at the respective end portions of the counter balance valve 4, a neutral spring may be provided at only one end portion of the counter balance valve 4.

REFERENCE NUMERALS

1: HYDRAULIC MOTOR MECHANISM (LIQUID PRESSURE MOTOR MECHANISM)
2: RELIEF VALVE (CONNECTION VALVE)
3: SWITCHING VALVE
4: COUNTER BALANCE VALVE
9: FIRST INLET/OUTLET PORT
10: SECOND INLET/OUTLET PORT
21: BACK PRESSURE CHAMBER
51: FIRST INLET/OUTLET PASSAGE
52: SECOND INLET/OUTLET PASSAGE
53: BYPASS PASSAGE
100: HYDRAULIC MOTOR (LIQUID PRESSURE MOTOR)
101: DIRECTION SWITCHING VALVE
102: TANK

The invention claimed is:

1. A liquid pressure motor comprising:
a first inlet/outlet port and a second inlet/outlet port both connected to a direction switching valve;
a first inlet/outlet passage which connects the first inlet/outlet port with a liquid pressure motor mechanism;
a second inlet/outlet passage which connects the second inlet/outlet port with the liquid pressure motor mechanism;
a counter balance valve which is connected to the first inlet/outlet passage and the second inlet/outlet passage;
a bypass passage which connects the first inlet/outlet passage between the counter balance valve and the liquid pressure motor mechanism with the second inlet/outlet passage between the counter balance valve and the liquid pressure motor mechanism;
a connection valve which is provided in the bypass passage and is opened when a fluid pressure in the first inlet/outlet passage or the second inlet/outlet passage becomes not lower than a working pressure; and
a pilot passage which is connected to the counter balance valve and through which a fluid pressure flows, the fluid pressure being introduced into a back pressure chamber of the connection valve by which chamber the working pressure of the connection valve is controlled, a switching valve connected to the pilot passage being provided to have a first changeover position where the back pressure chamber is connected to the tank and a second changeover position where the pilot passage is connected to the back pressure chamber, and by the switching valve the liquid pressure supplied to the liquid pressure motor mechanism being introduced into the back pressure chamber via the pilot passage when the liquid pressure motor mechanism is in operation, whereas, when the liquid pressure motor mechanism is being braked, the back pressure chamber being connected to the tank when the fluid pressure in the pilot passage becomes equal to or lower than a predetermined pressure, wherein, a neutral spring is provided at one or each end portion of the counter balance valve, a liquid pressure is introduced from the first inlet/outlet passage to one chamber of the counter balance valve, and a liquid pressure is introduced from the second inlet/outlet passage to the other chamber of the counter balance valve, a return spring is provided at one end portion of the switching valve, whereas a pilot pressure is introduced from the pilot passage to the other end portion of the switching valve, and a spring force of the return spring by which the switching valve returns to the first changeover position is arranged to be larger than a spring force of the neutral spring by which the counter balance valve returns to a neutral position.

2. The liquid pressure motor according to claim 1, wherein, a neutral position of the counter balance valve is a changeover position where the pilot passage is cut off from the first inlet/outlet port and the second inlet/outlet port.

3. The liquid pressure motor according to claim 1, wherein, a throttle is formed on a passage in the switching valve which connects the pilot passage with the back pressure chamber.

4. The liquid pressure motor according to claim 1, wherein, the connection valve is formed to be capable of being biased in a closing direction via a partition provided at the back pressure chamber of the connection valve.

5. The liquid pressure motor according to claim 2, wherein, a throttle is formed on a passage in the switching valve which connects the pilot passage with the back pressure chamber.

6. The liquid pressure motor according to claim 5, wherein, the connection valve is formed to be capable of being biased in a closing direction via a partition provided at the back pressure chamber of the connection valve.

7. The liquid pressure motor according to claim 6, further comprising:
a biasing spring which is provided in the back pressure chamber of the connection valve and biases the connection valve in the closing direction;
a piston which is the partition capable of biasing the biasing spring in a contracting direction; and
a pressure chamber which is divided from the back pressure chamber by the piston, a two speed switching control pressure being introduced into the pressure chamber.

8. The liquid pressure motor according to claim 7, wherein, the two speed switching control pressure is a two-speed switching signal pressure which is introduced into a pilot chamber of a two-speed switching valve.

9. The liquid pressure motor according to claim 7, wherein, the two speed switching control pressure is a two speed switching instruction pressure which is introduced from a two-speed switching valve into a tilt cylinder.

10. A liquid pressure motor comprising:
a first inlet/outlet port and a second inlet/outlet port both connected to a direction switching valve;
a first inlet/outlet passage which connects the first inlet/outlet port with a liquid pressure motor mechanism;
a second inlet/outlet passage which connects the second inlet/outlet port with the liquid pressure motor mechanism;
a counter balance valve which is connected to the first inlet/outlet passage and the second inlet/outlet passage;
a bypass passage which connects the first inlet/outlet passage between the counter balance valve and the liquid pressure motor mechanism with the second inlet/outlet passage between the counter balance valve and the liquid pressure motor mechanism;
a connection valve which is provided in the bypass passage and is opened when a fluid pressure in the first inlet/outlet passage or the second inlet/outlet passage becomes not lower than a working pressure; and
a pilot passage which is connected to the counter balance valve and through which a fluid pressure flows, the fluid pressure being introduced into a back pressure chamber of the connection valve by which chamber the working pressure of the connection valve is controlled,
a switching valve connected to the pilot passage being provided to have a first changeover position where the back pressure chamber is connected to the tank and a second changeover position where the pilot passage is connected to the back pressure chamber, and
by the switching valve the liquid pressure supplied to the liquid pressure motor mechanism being introduced into the back pressure chamber via the pilot passage when the liquid pressure motor mechanism is in operation, whereas, when the liquid pressure motor mechanism is being braked, the back pressure chamber being connected to the tank when the fluid pressure in the pilot passage becomes equal to or lower than a predetermined pressure, wherein,
a throttle is formed on a passage in the switching valve which connects the pilot passage with the back pressure chamber.

11. The liquid pressure motor according to claim 10, wherein,
the connection valve is formed to be capable of being biased in a closing direction via a partition provided at the back pressure chamber of the connection valve.

12. The liquid pressure motor according to claim 10, wherein,
a neutral position of the counter balance valve is a changeover position where the pilot passage is cut off from the first inlet/outlet port and the second inlet/outlet port.

13. A liquid pressure motor comprising:
a first inlet/outlet port and a second inlet/outlet port both connected to a direction switching valve;
a first inlet/outlet passage which connects the first inlet/outlet port with a liquid pressure motor mechanism;
a second inlet/outlet passage which connects the second inlet/outlet port with the liquid pressure motor mechanism;
a counter balance valve which is connected to the first inlet/outlet passage and the second inlet/outlet passage;

a bypass passage which connects the first inlet/outlet passage between the counter balance valve and the liquid pressure motor mechanism with the second inlet/outlet passage between the counter balance valve and the liquid pressure motor mechanism;

a connection valve which is provided in the bypass passage and is opened when a fluid pressure in the first inlet/outlet passage or the second inlet/outlet passage becomes not lower than a working pressure; and a pilot passage which is connected to the counter balance valve and through which a fluid pressure flows, the fluid pressure being introduced into a back pressure chamber of the connection valve by which chamber the working pressure of the connection valve is controlled, a switching valve connected to the pilot passage being provided to have a first changeover position where the back pressure chamber is connected to the tank and a second changeover position where the pilot passage is connected to the back pressure chamber, and by the switching valve the liquid pressure supplied to the liquid pressure motor mechanism being introduced into the back pressure chamber via the pilot passage when the liquid pressure motor mechanism is in operation, whereas, when the liquid pressure motor mechanism is being braked, the back pressure chamber being connected to the tank when the fluid pressure in the pilot passage becomes equal to or lower than a predetermined pressure, wherein the connection valve is formed to be capable of being biased in a closing direction via a partition provided at the back pressure chamber of the connection valve, wherein the liquid pressure motor further comprises:

a biasing spring which is provided in the back pressure chamber of the connection valve and biases the connection valve in the closing direction;

a piston which is the partition capable of biasing the biasing spring in a contracting direction; and a pressure chamber which is divided from the back pressure chamber by the piston, a two speed switching control pressure being introduced into the pressure chamber.

14. The liquid pressure motor according to claim 13, wherein, the two speed switching control pressure is a two-speed switching signal pressure which is introduced into a pilot chamber of a two-speed switching valve.

15. The liquid pressure motor according to claim 13, wherein, the two speed switching control pressure is a two speed switching instruction pressure which is introduced from a two-speed switching valve into a tilt cylinder.

* * * * *